United States Patent [19]

Kondrats

[11] Patent Number: 5,439,608
[45] Date of Patent: Aug. 8, 1995

[54] METHODS FOR THE COLLECTION AND IMMOBILIZATION OF DUST

[76] Inventor: Nicholas Kondrats, 5702 Cathedral Oaks Rd., Santa Barbara, Calif. 93117

[21] Appl. No.: 90,426

[22] Filed: Jul. 12, 1993

[51] Int. Cl.⁶ .................................................. C09K 3/22
[52] U.S. Cl. ...................................................... 252/88
[58] Field of Search ........................................ 252/88

[56] References Cited

U.S. PATENT DOCUMENTS

| | | | |
|---|---|---|---|
| 2,709,665 | 5/1955 | Campbell et al. | 252/88 |
| 3,391,079 | 7/1968 | Greenblatt | 252/88 |
| 3,690,727 | 9/1972 | Degginger | 252/88 |
| 3,954,662 | 5/1976 | Salyer et al. | 252/88 |
| 4,136,050 | 1/1979 | Brehm | 252/88 |
| 4,257,924 | 3/1981 | Chester | 252/88 |
| 4,316,811 | 2/1982 | Burns et al. | 252/88 |
| 4,425,252 | 1/1984 | Cangle et al. | 252/88 |
| 4,428,984 | 1/1984 | Schimizu et al. | 252/88 |
| 4,561,905 | 12/1985 | Kittle | 252/88 |
| 4,650,598 | 3/1987 | Roberts et al. | 252/88 |
| 4,737,305 | 4/1988 | Dohner | 252/88 |
| 4,780,143 | 10/1988 | Roe | 252/88 |
| 4,780,233 | 10/1988 | Roe | 252/88 |
| 4,801,635 | 1/1989 | Zinkan et al. | 252/88 |
| 5,028,350 | 7/1991 | Marsek | 252/88 |
| 5,256,419 | 10/1993 | Roe et al. | 252/88 |
| 5,256,444 | 10/1993 | Roe | 252/88 |

OTHER PUBLICATIONS

Hawley's Condensed Chemical Dictionary, 11th Ed. Van Nostrand Reinhold, NY 1987. p. 352 (No Month Available).

*Primary Examiner*—Prince Willis, Jr.
*Assistant Examiner*—James M. Silbermann
*Attorney, Agent, or Firm*—Townsend and Townsend Khourie and Crew

[57] ABSTRACT

The use of a surface coating composition comprising a surface coating concentrate and water is disclosed for the collection and suppression of dust particles. In particular, the surface coating composition is used to prepare substantially airborne-dust free rooms for the painting and finishing of products such as automobiles. The surface coating concentrate comprises a cationic surfactant, a glycol ether, a mineral oil, water, and optionally, glycerine, a tackiness agent, dyes, odorants, and the like.

10 Claims, No Drawings

METHODS FOR THE COLLECTION AND IMMOBILIZATION OF DUST

BACKGROUND OF THE INVENTION

This invention generally relates to dust collection and dust suppression. More particularly, this invention relates to surface coating compositions and methods for immobilizing airborne dust.

"Dust" refers to finely comminuted, solid particulate matter which is suspended in a gas, typically air. Dust particles are readily carried by turbulent eddies in the air. As a result of this contact or friction with the air, dust particles generally carry an appreciable electrostatic charge. Common industrial sources of dust are open operations, leaks and spills, storage and disposal, and poor housekeeping. For purposes of the present invention, the dust can either already be in existence prior to or be produced contemporaneously with the use of the instant invention.

Dust may pose health and safety hazards. For example, respirable coal mine dust has been implicated as a cause of Pneumonoconiosis or "Black Lung" disease. Similar concerns are raised when other materials such as sulfur, phosphates, clays, or other finely divided materials generate dust in handling operations during mining, transportation, storage, or use. Fertilizer dust has also raised health concerns due to human and animal inhalation and also poses a problem of spontaneous combustion. The cement industry also is concerned with fugitive dust dissemination during the manufacture, transport, and storage steps.

Moreover, dust can also cause economic problems in many commercial endeavors. For example, dust can accumulate on the surface of a product to be painted, varnished or otherwise surface-treated and cause a slight pebbly appearance which can be thoroughly objectionable to the fastidious customer. This problem arises even in the instance of a freshly washed product.

Dust suppression and dust collection are related but distinct processes. Dust collection involves the removal of dust particles from the gas in which they are suspended; whereas dust suppression connotes the prevention or reduction of the extent to which finely particulate solid matter becomes suspended in a gas. A variety of procedures and apparatus are available for dust collection and suppression. Mechanical methods include inertial and electrostatic precipitators, packed-bed filters and the like. Ventilation and/or exhaust fans are also used. These mechanical systems are seen to have the inherent drawbacks of being cumbersome, extremely expensive, and not suitable for small-scale dust suppression and collection.

Chemical methods have also been used for the collection and suppression of dust. These chemical type controls have been generally limited to two basic types, crusting agents and water types. The water type controls, including a number of aqueous solutions (of surfactants, etc.) and aqueous foam compositions, are aimed at preventing dust particles from becoming airborne by keeping them wet. These chemical dust collection and suppression compositions and methods suffer various disadvantages. The crusting agents often include excessive aromatic or other less biodegradable or toxic materials. Moreover, the aqueous methods can promote rusting, and hence, may damage equipment. Moreover, excessive water may create slippery conditions and unwanted humidity.

Therefore, there is a need for compositions for dust collection and suppression which quickly enhance the settling of airborne dust and which are substantially biodegradable and nontoxic in the environment.

SUMMARY OF THE INVENTION

The present invention provides compositions and methods for the collection and suppression of dust particles, wherein the surface coating composition comprise one part of a surface coating concentrate mixed with between about 10 and 40 parts of water. The surface coating concentrate of the present invention preferably includes about 5 to 20%, by weight, of a cationic surfactant; about 1 to 5%, by weight, of a glycol ether; and about 10 to 20%, by weight, of a mineral oil, with the balance being water. According to one embodiment, the concentrate further comprises about 1 to 5%, by weight, of glycerine. The concentrate may optionally contain a tackiness agent, dyes, odorants, and the like.

In a preferred embodiment of this invention, the dust collection and suppression composition is substantially biodegradable and nontoxic and does not create adverse environmental effects. A particularly preferred surface coating concentrate comprises about 9%, by weight, of a cationic surfactant; 2%, by weight, of a glycol ether; and 14%, by weight, of mineral oil, with the balance being water. Preferably, one part of the concentrate is diluted with eleven parts of water to produce the surface coating composition.

The surface coating compositions of the present invention are easily applied to surfaces as a thin coating of an aqueous emulsion. After drying, these compositions quickly and efficiently enhance the settling of dust particles. The compositions are easily removed after use with relatively reduced health and environmental risk.

Additional objects and advantages of the compositions and methods of the present invention will become apparent from the following detailed discussion.

DESCRIPTION OF SPECIFIC EMBODIMENTS

The instant invention is directed to compositions and methods for dust collection and dust suppression. A surface coating composition is utilized for immobilizing dust. The surface coating composition is derived from a surface coating concentrate which comprises a cationic surfactant, a glycol ether, mineral oil, and optionally, a tackiness agent, dyes, odorants, and the like.

0262
Components of the Surface Coating Composition

The surface coating concentrate used to produce the surface coating composition of the present invention contains between about 10 and 20% of mineral oil, by weight, and more preferably, between about 12 and 18%. Most preferably, the concentrate will contain 14% mineral oil, by weight.

Mineral oil is a mixture of liquid hydrocarbons obtained from petroleum. Typically, mineral oil is biodegradable. The mineral oil used in the present invention should be of USP grade and have a viscosity of between about 100 and 1000 centipoise. Preferably, the mineral oil will have a viscosity of about 350 centipoise.

Other embodiments will employ vegetable oils, animal oils, synthetic oils of the silicone type, synthetic oils of the polyolefin type, synthetic oils of the polyester type, and the like as a substitute for the mineral oil. Typically, a preservative will be used in conjunction with the mineral oil substitute. Examples of animal oils include fish oil and lard oil. Examples of vegetable oils include peanut oil, linseed oil, soybean oil, castor oil and corn oil. Examples of synthetic oils include biphenyl compounds (e.g., isopropyl biphenyl and isoamyl biphenyl), terphenyl compounds as described in West German Patent Provisional Publication No. 2,153,635, phosphoric acid compounds (e.g., triphenyl phosphate), naphthalene compounds as described in West German Patent Provisional Publication No. 2,141,194, methane compounds as described in West German Patent Provisional Publication No. 2,153,634, phthalic acid compounds, (e.g., diethyl phthalate, dibutyl phthalate and dioctyl phthalate) and salicylic acid compounds (e.g., ethyl salicylate).

The surface coating concentrate further contains between 1 and 5%, by weight, of a glycol ether, and more preferably, between 1 and 4%, by weight. Most preferably, the concentrate contains 2%, by weight, of the glycol ether. The glycol ether component serves to solvate the mineral oil. The glycol ether may also serve to reduce any corrosivity associated with the quaternary ammonium salt which may be used as the cationic surfactant.

Preferably, the glycol ether component will be selected from the group consisting of ethylene glycol ethers, polyethylene glycol ethers, and propylene glycol ethers. One of skill in the art will appreciate that the glycol ethers may be used alone or in combination. Preferred examples of ethylene glycol ethers include, but are not limited to, ethylene glycol monoalkyl ethers, such as ethylene glycol monomethyl ether (also known as methyl Cellosolve), ethylene glycol dialkyl ethers, such as ethylene glycol dimethyl ether (also known as dimethyl Cellosolve), and ethylene glycol monoalkyl ether esters, such as ethylene glycol monoethyl ether acetate (also known as Cellosolve acetate). Preferred examples of polyethylene glycol ethers include, but are not limited to, diethylene glycol monoalkyl ethers, such as diethylene glycol monobutyl ether (also known as butyl ethyl Cellosolve or butyl Carbitol), diethylene glycol dialkyl ethers; and diethylene glycol monoalkyl ether esters, such as diethylene glycol monoethyl ether acetate (also known as Carbitol acetate). A preferred example of a propylene glycol ether is propylene glycol monotertbutyl ether (also known as Glycol ether PTB).

The surface coating concentrate also includes an effective amount of a cationic surfactant, with the term "effective amount" referring to that concentration of surfactant necessary to provide a consistent, stable emulsion. By emulsion, it is meant that the oil phase is present in the water phase in the form of droplets. Thus, the instant emulsions have water as the continuous phase and the mineral oil as the dispersed phase. Typically, the surface coating concentrate will contain between about 5 and 20%, by weight, and preferably, between about 7 and 16%, by weight, of a cationic surfactant. Most preferably, about 9%, by weight, of a cationic surfactant will be used to prepare the surface coating concentrate.

Cationic surfactants carry a positive charge when dissolved in aqueous media. Since dust generally carries an appreciable electrostatic charge due to friction with the air, the positive charge of the surfactant aids in the collection and suppression of the dust particles. Examples of suitable cationic surfactants includes those found in the Kirk-Othmer Encyclopedia of Chemical Technology, 3rd Ed., Vol. 22, 377-384 (1983), which is incorporated herein by reference. One of skill in the art will appreciate that the cationic surfactants may be used alone or in combination.

Typically, the positive charge of a cationic surfactant resides on an amino or quaternary nitrogen. A preferred cationic surfactant is a quaternary ammonium compound. Examples of quaternary ammonium compounds include dialkyldimethylammonium salts (salts of $RR'N(CH_3)_2{}^+$); alkylbenzyldimethylammonium chlorides (salts of $R(C_6H_5CH_2)N(CH_3)_2{}^+$); alkyltrimethylammonium salts (salts of $RN(CH_3)_3{}^+$); and alkylpyridinium halides (salts of R-N-pyridine), including but not limited to those found in Table 1 below. Most preferably, the cationic surfactant will be biodegradable. An example of such a surfactant is the dialkyldimethylammonium salt wherein the alkyl groups comprise coco, for example dicocoquat.

TABLE 1

| Quaternary Ammonium Surfactants | | |
|---|---|---|
| Trade name | R and/or R' | Manufacturer |
| Adogen 432 CG | $C_{12-18}$ | Sherex Chemical Co., Inc. (Sherex) |
| Adogen 442 | Hydrogenated tallow | Sherex |
| Adogen 462 | Coco | Sherex |
| Adogen 470 | Tallow | Sherex |
| Arosurf TA100 | $C_{16-18}$ | Sherex |
| Arquad 2C-75 | Coco | Sherex |
| Kemamine Q9702C | Hydrogenated tallow | Witco Chemical Corp., Humko Chemical Div. (Humko) |
| Kemamine Q6502 | Coco | Humko |
| Kemamine Q2802C | Behenyl | Humko |
| Kemamine Q2982C | Erucyl | Humko |
| Variquat K300 | Coco | Sherex |
| Varisoft 137 | Hydrogenated tallow | Sherex |
| Varisoft DHT | Hydrogenated tallow | Sherex |
| Barquat MB-50 | Myristyl | Lonza, Inc. (Lonza) |
| Barquat OJ-50 | Oleyl | Lonza |
| BTC 50 | $C_{12-14-16-18}$ | Onyx Chemical Co., (Onyx) |
| BTC 824 | $C_{14-16-18}$ | Onyx |
| Ammonyx 4002 | Stearyl | Onyx |
| Ammonyx KP | Oleyl | Onyx |
| Dibactol | Myristyl | Hexcel Corp., Hexcel Chemical Products (Hexcel) |
| Hyamine 3500 | $C_{12-14-16}$ | Rohm & Haas Co. (R & H) |
| Kemamine BQ 2802C | Behenyl | Humko |
| Kemamine BQ 9742C | Tallow | Humko |
| Roccal II | $C_{8-18}$ | Sterling Drug Inc., Lehn & Fink Industrial Products Division (L & H) |
| Stedbac | Stearyl | Hexcel |
| Variquat 50ME | $C_{12-14-16}$ | Sherex |
| Variquat B35 | Hydrogenated tallow | Sherex |
| Varisoft SDC | Stearyl | Sherex |
| Zephiran Chloride | Alkyl | Sterling Drug Inc., Sterling Organics Div. (Sterling) |
| Acetoquat CTAB | Cetyl | Aceto Chemical Co., Inc. |

TABLE 1-continued

| Quaternary Ammonium Surfactants | | |
|---|---|---|
| Trade name | R and/or R' | Manufacturer |
| Ammonyx CTAC | Cetyl | (Aceto) Onyx |
| Bromat | Cetyl | Hexcel |
| Kemamine Q9743C | Tallow | Humko |
| Mytab | Myristyl | Hexcel |
| Acetoquat CPC | Cetyl | Aceto |
| Acetoquat CPB | Cetyl | Aceto |
| Dehyquart C | Lauryl | Henkel Corp., Chemical Specialties Div. (Henkel) |
| Ammonyx CETAC | Cetyl | Onyx |

Water is used to prepare both the surface coating concentrate and the final surface coating composition. The water is used as an inexpensive means to transport and distribute the dust suppressant. Water may form 80 to 98%, by weight, of the final surface coating composition. Preferably, the concentrate is prepared with deionized water having a resistivity of about 18 megaohm-cm (available from, for example, Millipore, Bedford, Mass.).

According to one aspect of the present invention, the surface coating composition will further comprise between about 1 and 5%, by weight, of glycerine.

Optionally, the surface coating composition may also contain a component to increase the "tackiness" of the coating. Typically, the tackiness agent will be present at a low level, ranging from about 0.1 to 2%, by weight, of the surface coating concentrate. Preferred tackiness agents are biodegradable and include, for example, colloidal calcium chloride, xanthan gum (see, e.g., Marsek (1991) U.S. Pat. No. 5,028,350, which is incorporated herein by reference), and various acrylic compositions. Further, the surface coating composition may include a variety of other materials such as dyes, odorants and the like.

Preparation and Use of the Surface Coating Composition

The surface coating compositions of the instant invention are suitable for use with any material prone to create dust. For example, the surface coating compositions of the instant invention can be used for the collection and suppression of coal dust, green or calcined petroleum coke dust, steel mill sinter dust, metallurgical coke dust, fertilizer dusts including raw materials process and product dusts, cement raw materials and clinker, basic oxygen furnace dust.

The surface coating compositions of the instant invention are especially effective in the preparation of a substantially airborne-dust-free room for use in painting, staining, varnishing, and other surface-finishing applications. These compositions and methods may also be used on a smaller scale, for example, to prepare a dust free table top or other surface on which to place the product to be painted or finished.

The instant surface coating compositions are derived from the surface coating concentrate. The concentrate is prepared by first mixing a glycol ether with a mineral oil. This admixture is then added to a cationic surfactant. The resulting mixture is emulsified with water. Tackiness agents, dyes, odorants, and the like are then added to the emulsion to produce the final surface coating concentrate.

The surface coating composition can be prepared from the surface coating concentrate at the dust treatment site. This on-site preparation method saves the cost of transporting water. Thus, the surface coating concentrate is prepared and transported to the treatment site. Immediately prior to application, the surface coating concentrate is further diluted or emulsified with water. The amount of water used may vary with the type of surface to be treated and the means of application. Generally, one part of the surface coating concentrate will be mixed with between about 10 and 40 parts of water, by weight; more preferably with between 10 and 20 parts of water, by weight; and most preferably about 11 parts of water, by weight.

Prior to treatment with the surface coating composition, the room or surface should be thoroughly cleaned. The surface coating composition may then be applied by a variety of methods, such as spraying, brushing, painting, slurrying, rinsing, etc. Typically, a light coating of the surface coating composition is applied using a manual pump sprayer.

The surface coating composition is applied sparingly to the surface to be treated. To prepare a substantially airborne-dust free room, a substantially continuous layer of the surface coating composition is applied to the floor of the room. One gallon of the surface coating composition should cover approximately 2,000 sq. feet (0.8 wet mils).

Typically, the surface coating composition is then permitted to dry, normally at atmospheric temperatures and pressures. However, the treated surface need not be dry prior to use. Drying will take about 10 to 30 minutes in typical applications (at room temperature and 30% humidity). Longer drying times may be needed at lower temperatures or higher humidity.

The surface coating composition is capable of controlling and suppressing dust for extended periods of time. For example, a single application of the surface coating composition will suffice to control and suppress dust in a 250 sq. foot paint booth for a time sufficient to paint four cars. The dry treated surface may be quickly brushed or swept with a broom to remove and collect the spent composition with its adhered dust particles.

In order that the invention described herein can be more fully understood, the following examples are set forth. It should be understood that these examples are for illustrative purposes only, and are not to be construed as limiting this invention in any manner.

EXPERIMENTAL

Preparation of a Surface Coating Concentrate

To 12 parts, by weight, of the cationic surfactant Sherex Carspray 300 (as a 75% emulsion), was added, with stirring, 2 parts, by weight, of propylene glycol monotertbutyl ether and 15 parts, by weight, of mineral oil (USP grade, 350 centipoise). To this solution was then added deionized water, 72 parts by weight, with stirring to form the surface coating concentrate as an emulsion.

Preparation of the Surface Coating Composition

To a reaction vessel containing one part, by weight, of the surface coating concentrate was slowly added, with stirring, eleven parts, by weight, of water. The resulting dust free surface coating composition may be used immediately or stored indefinitely.

Application of the Surface Coating Composition

The area to be treated was thoroughly cleaned and dried. A light coat of the surface coating composition was applied using a manual pump sprayer. The spent surface coating composition was swept up using a broom.

For collecting and suppressing dust in auto paint booths, a Hudson-type sprayer was used to apply the composition to the floor of the booth. The composition was removed and reapplied after about 2–4 spray cycles.

The disclosures in this application of all articles and references, including patents, are incorporated herein by reference.

It is to be understood that the above description is intended to be illustrative and not restrictive. Many embodiments will be apparent to those of skill in the art upon reviewing the above description. The scope of the invention should, therefore, be determined not with reference to the above description, but should instead be determined with reference to the appended claims, along with the full scope of equivalents to which such claims are entitled.

The invention has been described above in some detail for the purposes of clarity and understanding. It will be apparent, however, that certain changes and modifications can be practiced within the scope of the appended claims.

What is claimed is:

1. A method of preparing a substantially airborne-dust-free room, comprising the steps of:
    applying a substantially continuous layer of a surface coating composition to the floor of the room, said coating including one part of a surface coating concentrate containing
    (a) between 5 and 20%, by weight of said concentrate, of a cationic surfactant;
    (b) a mixture containing between 1 and 5%, by weight of said concentrate, of a glycol ether and between 10 and 20%, by weight of said concentrate, of mineral oil; and
    (c) the balance being water;
    and between 10 and 40 parts water.

2. The method of claim 1, wherein said cationic surfactant is 9%, by weight of said concentrate; said glycol ether is 2%, by weight of said concentrate; and said mineral oil is 14%, by weight of said concentrate.

3. The method of claim 1, wherein one part of the surface coating concentrate is mixed with eleven parts of water.

4. The method of claim 1, wherein said cationic surfactant is a quaternary ammonium salt.

5. The method of claim 4, wherein said cationic surfactant is dicocoquat.

6. The method of claim 1, wherein said glycol ether is propylene glycol monotertbutyl ether.

7. The method of claim 1, wherein said surface coating concentrate further comprises between 1 and 5%, by weight of glycerine.

8. A method of painting an object, said method comprising the steps of:
    providing a substantially airborne-dust-free room for painting operations, said providing comprising
    applying a substantially continuous layer of a surface coating composition to a surface in the room, said coating including one part of a surface coating concentrate containing
    (a) between 5 and 20%, by weight of said concentrate, of a cationic surfactant; and
    (b) a mixture containing between 1 and 5 %, by weight of said concentrate, of a glycol ether and between 10 and 20%, by weight of said concentrate, of mineral oil the balance being water;
    and between 10 and 40 parts water;
    placing said object in said room; and
    applying paint to said object.

9. The method of claim 8 wherein said object is a automobile.

10. The method of claim 8 further comprising removing said coating composition with a broom after said applying paint.

* * * * *